United States Patent [19]

Sawairi

[11] Patent Number: 4,471,406

[45] Date of Patent: Sep. 11, 1984

[54] MULTILAYER CAPACITOR

[75] Inventor: Hitoshi Sawairi, Hirakata, Japan

[73] Assignee: Matsushita Electric Industrial Co., Ltd., Osaka, Japan

[21] Appl. No.: 427,759

[22] Filed: Sep. 29, 1982

[30] Foreign Application Priority Data

Sep. 30, 1981 [JP] Japan .................. 56-156561
Sep. 17, 1982 [JP] Japan .................. 57-162517

[51] Int. Cl.³ .................... H01G 4/38; H01G 4/10
[52] U.S. Cl. ...................... 361/328; 361/321
[58] Field of Search ............... 361/304, 309, 311–313, 361/320, 321, 328; 29/25.42

[56] References Cited

U.S. PATENT DOCUMENTS

| | | | |
|---|---|---|---|
| 3,235,939 | 2/1966 | Rodriguez et al. | 361/321 X |
| 3,710,210 | 1/1973 | Heron | 361/309 |
| 3,882,059 | 5/1975 | Elderbaum | 29/25.42 |
| 4,074,340 | 2/1978 | Leigh | 361/321 |
| 4,347,650 | 9/1982 | McLarney et al. | 29/25.42 |

Primary Examiner—Donald A. Griffin
Attorney, Agent, or Firm—Birch, Stewart, Kolasch & Birch

[57] ABSTRACT

A multilayer capacitor comprises first electrode layers having respective first conductor layers, second electrode layers having respective second conductor layers, dielectric layers each having opposite surfaces on which the first and second electrode layers are formed with the first and second conductor layers positioned adjacent the periphery of the capacitor, and independent electroconductive layers formed on each surface of each of the dielectric layers and lying in the same plane as occupied by the electrode layers on such surface of the respective dielectric layer.

7 Claims, 21 Drawing Figures

MULTILAYER CAPACITOR

BACKGROUND OF THE INVENTION

The present invention generally relates to a multilayer capacitor and, more particularly, to a multilayer capacitor of a type comprising a plurality of capacitors formed in a single integer.

In general, where a multilayer capacitor is to be manufactured, internal electrode layers, forming respective parts of the capacitors, and connecting conductor layers extending outwardly therefrom to the periphery of the assembly are formed so as to have a suitable surface area corresponding to a desired capacitance without being formed entirely on the same layer. Accordingly, when it comes to a currently widely employed printing method wherein desired electrode layers are formed by printing on a dielectric layer and another dielectric layer overlaying the printed electrode layers is also formed by printing, the thickness of that portion tends to increase with increase of the number of the layers even though each electrode layer is in the form of a thin film having a small thickness.

FIG. 1 of the accompanying drawings illustrates the prior art multilayer capacitor in sectional representation, which capacitor comprises a plurality of capacitor elements positioned one above the other, each capacitor element being comprised of a dielectric layer 1 and a pair of electrode layers 2 and 3 on respective sides of the dielectric layer 1. Usually, the electrode layers 2 and 3 have respective connecting conductor layers 4 and 5 connected thereto, or formed integrally therewith, and positioned in laterally offset or displaced relation to each other, said connecting conductor layers 4 and 5 being in turn connected to respective terminal electrodes 6 and 7 which are formed at the periphery of the assembly by depositing an electroconductive paste or by vapor deposition of metal. The electrode layers 2 and 3 have such patterns as shown in FIGS. 2(a) and 2(b), respectively, and the connecting conductor layers 4 and 5 are so positioned as to be in laterally offset or displaced relation to each other while the electrode layers 2 and 3 are in register with each other with the respective dielectric layer 1 held therebetween.

In the prior art multilayer capacitor so constructed as shown in FIGS. 1 and 2, the peripheral portion of the multilayer capacitor where the connecting conductor layers 4 and 5 are located has a thickness $t_1$ which is smaller than the thickness $t_2$ of the body portion of the same capacitor where the electrode layers 2 and 3 are located. The difference between the thicknesses $t_2$ and $t_1$ constitutes an undesirable peripheral indent of varying size which is larger at a peripheral portion of the multilayer capacitor where no connecting conductor layers are located, thereby causing the multilayer capacitor to have its opposite surfaces lacking in flatness. In addition, where the layers 2, 3, 4 and 5 are formed by the use of the screen printing technique, ink bulges tend to be formed between the layers 2 and 4 and also between the layers 3 and 5 at a location where the peripheral indent would subsequently be formed. The presence of the ink bulges results in increased surface area of the respective electrode layers 2 and 3 over a desired or required value, which in turn results in the increased capacitance of the multilayer capacitor over a desired or required value, thereby causing the multilayer capacitors to deviate in capacitance from one capacitor to another during the manufacture thereof.

FIG. 3 of the accompanying drawings illustrates in sectional representation another prior art multilayer capacitor of a type employing a plurality of, for example, two, sets 8 and 9 of electrode layers forming respective layered capacitor units A and B, said electrode layer sets 8 and 9 being insulated from each other. In this type of the multilayer capacitor shown in FIG. 3, the use of the screen printing technique to form the electrode layers of these sets 8 and 9 tends to result in the formation of a varying space between the laterally neighbouring pairs of the electrode layers of these two sets 8 and 9 because of the formation of ink bulges. By way of example, as shown in FIG. 3, while the lowermost electrodes of the respective sets 8 and 9 are spaced a design distance D from each other, the presence of the ink bulges tends to cause the uppermost electrode layers of the sets 8 and 9 to be spaced from each other a distance d which is smaller than the distance D. This is problematic in that, not only does the multilayer capacitor fail to have its opposite surfaces being flat, but also the voltage breakdown characteristic of the multilayer capacitor tends to be adversely affected.

According to the prior art method for making multilayer capacitors, it is a general practice to form the electrode layers simultaneously on a plurality of capacitor regions and then to separate these capacitor regions to provide respective multilayer capacitor chips. An example of this prior art method is illustrated in FIGS. 4 to 6. Referring to FIGS. 4 to 6, particularly to FIGS. 6(a) and 6(b), the multilayer capacitor is formed by repeatedly performing a required number of times a process which substantially comprises the step of forming on one surface of a dielectric layer 25 both of an electrode layer 21, including a plurality of, for example, four, electrode portions 21a, 21b, 21c and 21d occupying respective four corner areas I, II, III and IV of the dielectric layer 25, and an electrode layer 22 including a corresponding number of electrode portions 22a, 22b, 22c and 22d arranged in predetermined patterned relation to the electrode portions 21a, 21b, 21c and 21d as shown in FIG. 6(a), the step of subsequently forming an overlaying dielectric layer 26 overlaying the dielectric layer 25 with the electrode layers 21 and 22 sandwiched therebetween as shown in FIG. 6(b), and the step of forming, on one surface of the overlaying dielectric layer 26 remote from the dielectric layer 25, a counter-electrode layer 23 including a corresponding number of counter-electrode portions 23a, 23b, 23c and 23d each formed so as to overhang the associated electrode portions 21a and 22a, 21b and 22b, 21c and 22c, or 21d and 22d of the respective electrode layers 21 and 22 as shown in FIG. 6(b). The capacitor assembly so formed by repeatedly performing the above described process is, after having been dried, cut into two capacitor components along the broken line A-B as shown in FIG. 4(a) to separate the electrode portions 21a and 21c from the associated electrode portions 21b and 21d, followed by a trimming process to cut the components along the respective broken lines C-D, C'-D', E-F and G-H to provide the four multilayer capacitor chips. During the trimming process, care is required to allow connecting conductor layers 27 extending outwards from the electrode portions 22a to 22d and 23a to 23d to be exposed to the outside when the capacitor components have been so cut. Each of the capacitor chips is thereafter made up by applying or depositing an electroconductive paste to side faces of the respective chip to form electrode terminals for external electrical connection, each of said terminals connecting the exposed ends of the connecting conductor layers together so that the respective capacitor chip can have an electric equivalent circuit shown in FIG. 4(b) and having three terminals 29a, 29b and 29c. It is to be noted that the other side faces 30 of each of the capacitor chips where no connecting conductor layer is exposed are also applied with an electroconductive paste 28 to provide relay terminals through which other electric component parts can be interconnected as shown in FIG. 5. In FIG. 5, reference numeral 31 represents points of connection of the connecting conductor layers to the electrode terminals. It is also to be noted that the formation of the electrode layers 21, 22 and 23 and also that of the overlaying dielectric layers 26 are carried out by the use of the printing technique and that the number of repetition of the above described process depends on the number of the layers desired or required in the resultant multilayer capacitor.

In the above discussed art method, where the patterns of the electrode layers 21, 22 and 23 in the corner areas I and III are reversed in position with those in the corner areas II and IV, respectively, the result would be such that, since the individual blocks do not assume the identical shape, the applied voltage may differ from one block to another, tending to provide the multilayer capacitors of varying capacitance. However, where they are arranged in the manner as shown in FIG. 4, any possible deviation in capacitances among the resultant multilayer capacitors can advantageously be minimized since each block receives the same process steps, but a disadvantage is involved in that a relatively large amount of the material such as respresented by the rectangular area C-D-D'-C' in FIG. 4(a) must be disposed of. The number of the rectangular areas of the material to be disposed of increases where more than four multilayer capacitor chips are to be manufactured from a single assembly, thereby posing the increased loss of expensive material.

SUMMARY OF THE INVENTION

Accordingly, the present invention has been developed with a view to substantially eliminating the disadvantages and inconveniences inherent in the prior art multilayer capacitor and the method for the manufacture thereof, and has for its essential object to provide an improved multilayer capacitor wherein, even if the number of the layers desired or required in the resultant multilayer capacitor is increased, no peripheral indent is substantially formed at the peripheral portion of the multilayer capacitor and, accordingly, the opposite surfaces of the multilayer capacitor can advantageously be retained flat.

Another important object of the present invention is to provide an improved multilayer capacitor of the type referred to above, which is substantially free from any possible deviation in capacitance during the manufacture thereof.

According to the present invention, there is provided an improved multilayer capacitor which comprises a plurality of first electrode layers each having a respective first connecting conductor layer, a plurality of second electrode layers each having a respective second connecting conductor layer, dielectric layers each having the opposite surfaces on which the first and second electrode layers are formed, respectively, with the first and second connecting conductor layers positioned adjacent the periphery of the respective dielectric layer, said second electrode layers which are positioned between the neighbouring two dielectric layers concurrently serving as the first electrode layers, said first and second electrode layers and said dielectric layers being fabricated together to define a plurality of layered capacitor units which are electrically insulated from each other, and a plurality of independent electroconductive layers formed on each surface of each of the dielectric layers and lying in the same plane as occupied by the electrode layers on such surface of the respective dielectric layer.

The independent electroconductive layers, the employment of which constitutes an essential feature of the present invention, are not electrically connected to any one of the first and second electrode layers and are, therefore, isolated from the other component parts of the multilayer capacitor except for the fact that they are deposited on each surface of each of the dielectric layers. Because of the employment of the independent electroconductive layers, they cooperate with the connecting conductor layers to avoid any possible formation of the peripheral indents at the peripheral portion of the resultant multilayer capacitor, thereby preserving the flatness of each of the opposite surfaces of the multilayer capacitor.

BRIEF DESCRIPTION OF THE DRAWINGS

These and other objects and features of the present invention will become apparent from the subsequent description taken in conjunction with preferred embodiments thereof with reference to the accompanying drawings, in which.

DETAILED DESCRIPTION OF THE EMBODIMENTS

Figure 7:
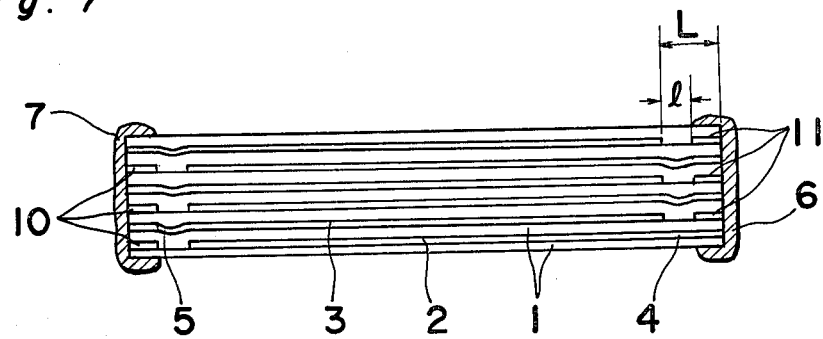
FIG. 7 is a side sectional view of a multilayer capacitor according to one embodiment of the present invention.
Figure 8A:
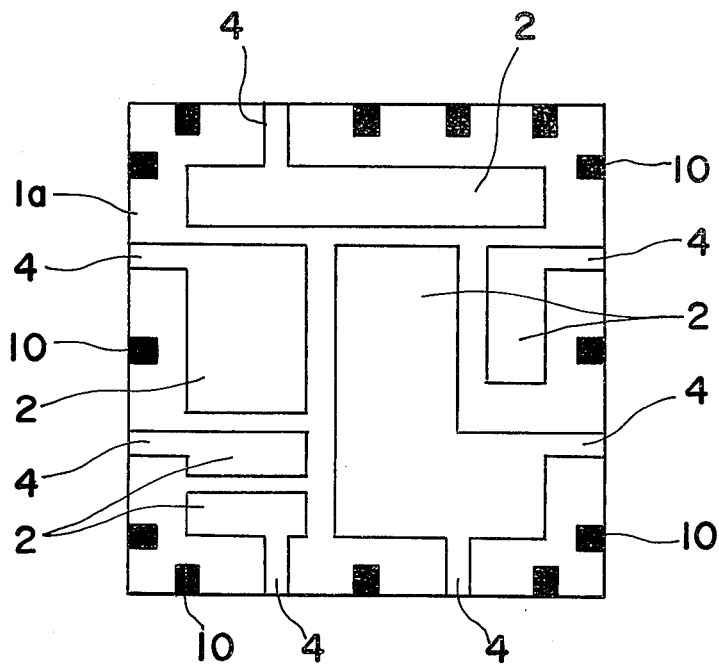
FIGS. 8(a) and 8(b) are plan views showing the respective patterns of different types of electrode layers employed in the capacitor shown in FIG. 7.
Figure 8B:
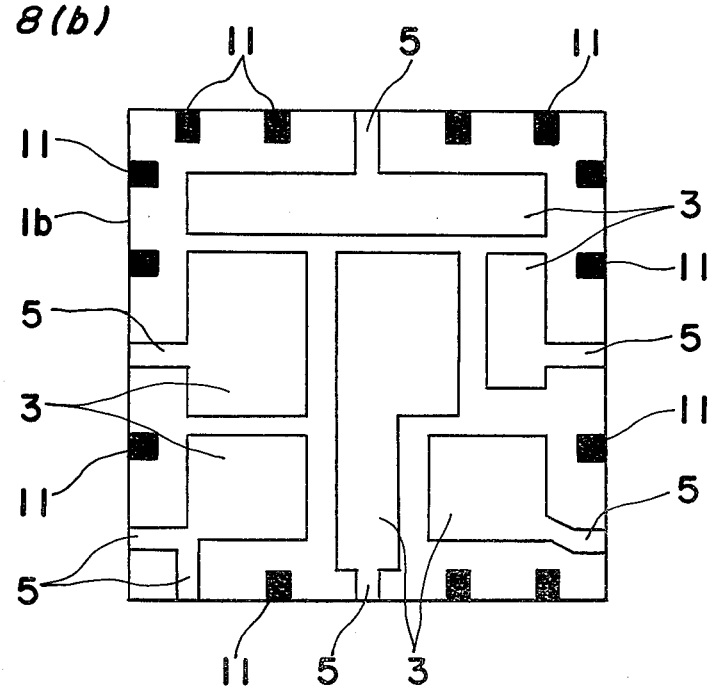

FIG. 7 is a side sectional view of a multilayer capacitor according to one embodiment of the present invention whereas FIGS. 8(a) and 8(b) illustrate the respective patterns of two sets of electroconductive layers to be positioned one above the other. Referring to these figures, reference numeral 1 represents dielectric layers each having its opposite surfaces on which first and second internal electrode layers 2 and 3 having respective first and second connecting conductor layers 4 and 5 are formed with the first and second conductor layers 4 and 5 positioned at a peripheral portion of the assembly in laterally off-set or displaced relation to each other, it being to be noted that the second electrode layers 3 which are positioned between the neighbouring two dielectric layers 1 concurrently serve as the first electrode layers. The multilayer capacitor so formed is provided with terminal electrodes 6 and 7 formed at respective side faces thereof, the terminal electrode 6 electrically connecting the first conductor layers 4 together while the terminal electrode 7 electrically connects the second conductor layers 5 together. The multilayer capacitor so far described may be fabricated in a manner similar to that described in connection with the prior art. Reference numerals 10 and 11 represent independent conductor layers lying in the same layers as the first and second electrode layers 2 and 3, respectively, in electrically insulated relation to any one of the electrode layers 2 and 3 and conductor layers 4 and 5. As shown in FIGS. 8(a) and 8(b), the independent conductor layers 10 and 11 are separated respectively from the first and second electrode layers 2 and 3 formed in predetermined pattern on the dielectric layers 1a and 1b together with the first and second connecting conductor layers 4 and 5, and are arranged in predetermined spaced relation to each other at locations where none of the layers 2, 3, 4 and 5 are formed. More specifically, while the conductor layers 4 and 5 are arranged on the respective dielectric layers 1a and 1b at predetermined locations at which they can be electrically connected with the terminal electrodes 6 and 7, the independent conductor layers 10 and 11 are arranged on the respective dielectric layers 1a and 1b at locations adjacent to the associated terminal electrodes 6 and 7 and when none of the connecting conductor layers 4 and 5 occupy. In this arrangement, while any one of the electrode layers 4 and 5 is spaced a distance L from the adjacent side face of the resultant multilayer capacitor as shown in FIG. 7, it can be spaced from the adjacent one of the independent conductor layers a distance l which is smaller than the distance L, the area represented by the distance l providing a non-conductive region.

Figure 4A:
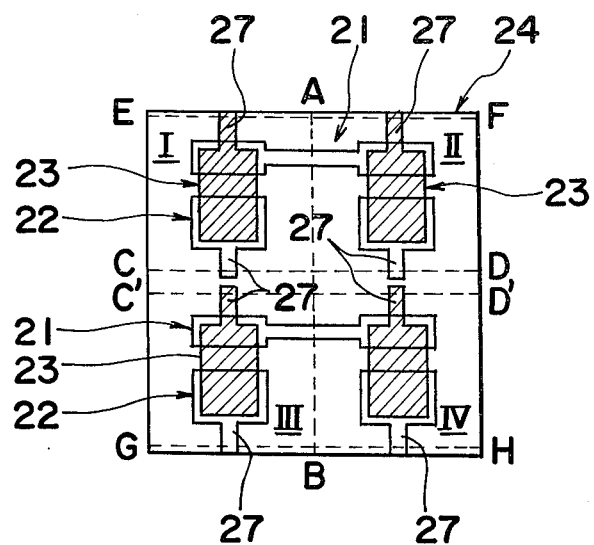
FIG. 4(a) illustrates the prior art method for making the multilayer capacitor chips, showing in plan view a substrate or capacitor block having different types of electrode layers with one type being shown by hatching.
Figure 4B:
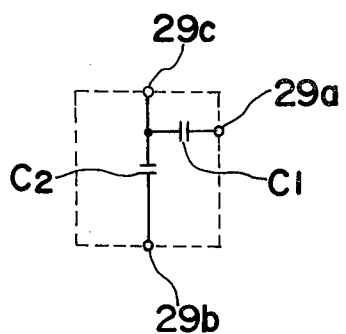
FIG. 4(b) is a diagram showing an equivalent electric circuit of one of the multilayer capacitor chips obtained from the capacitor block shown in FIG. 4(a)
Figure 9:
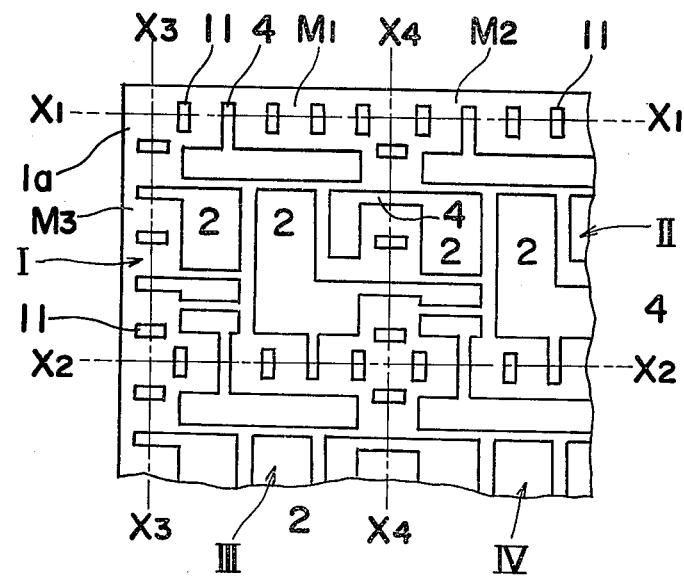
FIG. 9 is a plan view showing the pattern of the electrode layer of FIG. 8(a) for the purpose of illustration of a method for making multilayer capacitor chips.

In FIG. 9, there is illustrated the method of making the multilayer capacitor chips each having the first and second electrode layers patterned as shown in FIGS. 8(a) and 8(b), respectively, it being, however, noted that only the first electrode layers 2 are shown in FIG. 9. According to the method shown in FIG. 9, a generally rectangular capacitor block having a plurality of, for example, four, layered capacitor regions, I, II, III and IV, fabricated by the use of any known printing technique in a manner similar to the prior art method described with reference to FIGS. 4 to 6, each capacitor region being of the construction generally shown in FIGS. 7 and 8, is divided to provide the four multilayer capacitor chips by cutting the capacitor block along the lines $X_1$—$X_1$, $X_2$—$X_2$, $X_3$—$X_3$ and $X_4$—$X_4$. During the manufacture, the connecting conductor layers 4 and the independent conductor layers 10 extend over the lines of division and are continued to those in the neighbouring capacitor regions and marginal portions of the capacitor block which are to be subsequently disposed of. Accordingly, when the capacitor block is divided by cutting along the lines $X_1$—$X_1$, $X_2$—$X_2$, $X_3$—$X_3$ and $X_4$—$X_4$, the cut edges of the respective layers 4 and 10 in each of the capacitor chips are exposed to the outside from the lateral sides of the associated multilayer capacitor chip. It is to be noted that a similar description made in connection with the conductor layers 4 and 10 equally applies to the conductor layers 5 and 11.

From the foregoing, it is clear that the provision of the independent conductor layers 10 and 11 arranged on the peripheral portion of the multilayer capacitor at the locations where the connecting conductor layers are formed is effective to produce the multilayer capacitor having no peripheral indent in any one of the opposite surfaces thereof. In addition, since the terminal electrodes 6 and 7 connect not only the first and second conductor layers 4 and 5 together, respectively, at the lateral side faces of the multilayer capacitor, but also the independent conductor layers 10 and 11 together, the bondability of these terminal electrodes 6 and 7 can advantageously be increased. Furthermore, by manufacturing the multilayer capacitor chips from the single layered capacitor block in the manner described with reference to FIG. 9, it is possible to cause the layers 4, 5, 10 and 11 to be with no fault exposed to the outside from the lateral side faces of each multilayer capacitor chip for rigid connection with the terminal electrodes 6 and 7.

Figure 1:
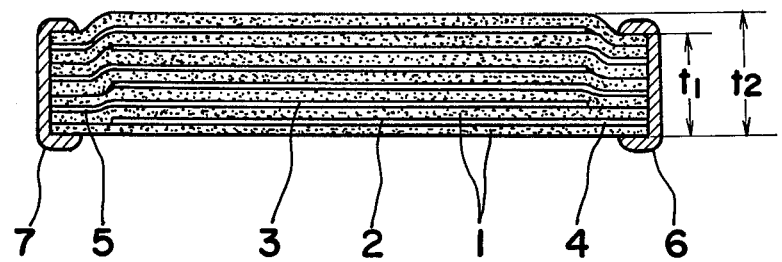
FIG. 1 is a side sectional view of one of the prior art multilayer capacitors.
Figure 2A:
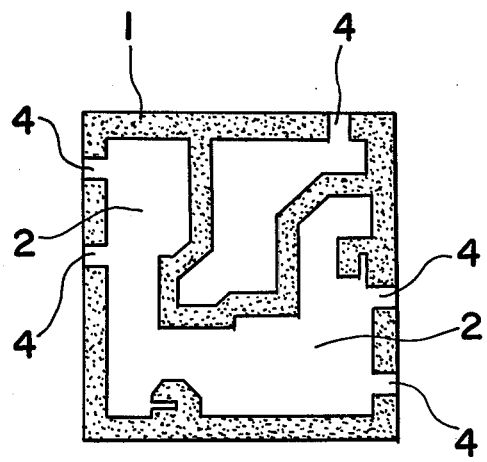
FIGS. 2(a) and 2(b) are top sectional views showing the respective patterns of electrode layers to be positioned in face-to-face relation with a dielectric layer held therebetween, as used in the prior art multilayer capacitor.
Figure 2B:
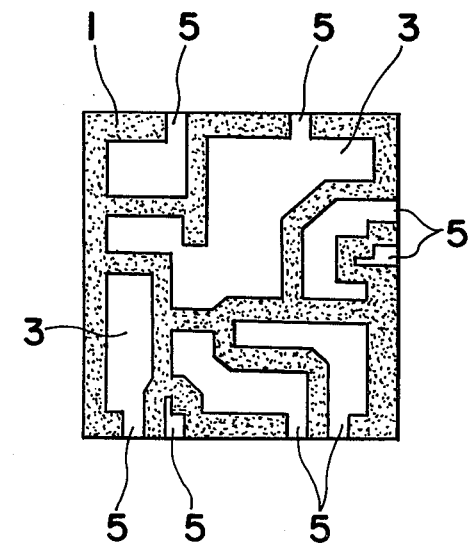
Figure 3:
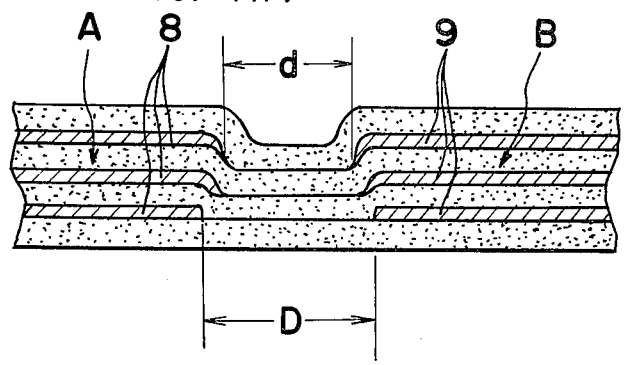
FIG. 3 is a side elevational view of a portion of another one of the prior art capacitor chips.
Figure 10:
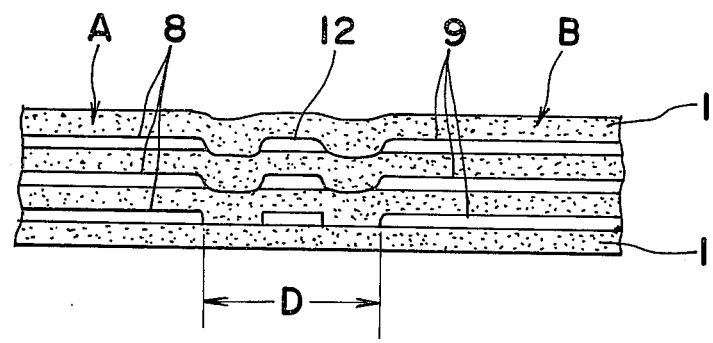
FIG. 10 is a side sectional view of a portion of the multilayer capacitor according to another embodiment of the present invention.

Another embodiment of the present invention will now be described with reference to FIG. 10. The embodiment shown in FIG. 10 corresponds to the prior art multilayer capacitor shown in and described with reference to FIG. 3. In the embodiment shown in FIG. 10, independent conductor layers 12 are formed between one set 8 of the electrode layers, forming the layered capacitor unit A, and another set 9 of the electrode layers forming the layered capacitor unit B and are positioned in the same plane as occupied by the electrode layers of both of the capacitor units A and B. With this arrangement as shown in FIG. 10, it is possible to avoid any possible formation of ink bulges at the adjacent edges of the respective electrode layers of both of the sets 8 and 9. Accordingly, not only can the design distance D be attained also at the space between the uppermost electrode layers of the sets A and B, but also any possible reduction in voltage breakdown characteristic can be avoided. In addition, even the multilayer capacitor according to the embodiment shown in FIG. 10 has its opposite surfaces being generally flat.

It is to be noted that the multilayer capacitor according to any one of the foregoing embodiments of the present invention has been shown as having dielectric layers forming the uppermost and lowermost layers. However, they may not be always necessary or may be replaced with the layers of any other suitable insulating material than the dielectric material.

FIGS. 11 to 15 illustrate a further embodiment of the present invention. It is to be noted that like parts shown in FIGS. 11 to 15 are designated by like reference numerals used in FIGS. 4 to 6 for the sake of brevity.

Figure 11:
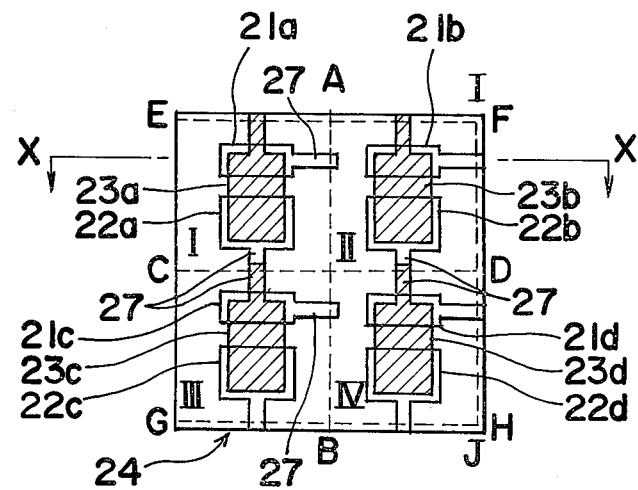
FIG. 11 is a plan view of a substrate or capacitor block for the purpose of illustration of a further embodiment of the present invention.
Figure 12:
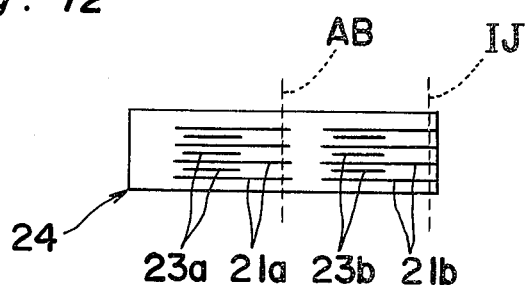
FIG. 12 is a schematic cross-sectional view taken along the line X—X in FIG. 11.

Referring first to FIG. 11, the four capacitor regions I, II, III and IV which will be cut along the lines A-B, C-D, E-F and G-H to provide the four separate multilayer capacitor chips having the connecting conductor layers 27 of the electrode layers 21, 22 and 23 which, during the manufacture thereof, are formed by the use of the printing technique so as to extend into the adjoining capacitor regions. More specifically, when reference is made only to the capacitor chip regions I and III, the connecting conductor layers 27 integral with the electrode portions 21a and 21c in the capacitor chip regions I and III extend into the next adjacent capacitor chips II and IV, respectively, while the connecting conductor layers 27 integral with the electrode portions 22a and 23a extend into the capacitor chip regions III and I as can readily be seen from FIG. 15. Similarly, the connecting conductor layers 27 integral with the electrode portions 23b and 23d in the capacitor chip regions II and IV extend into the capacitor chip regions IV and II, respectively, in a manner similar to the conductor layers 27 integral with the electrode portions 22a and 23a.

Figure 13A:
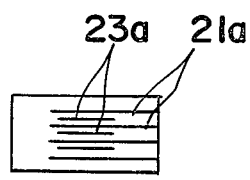
FIGS. 13 to 15 illustrate the sequence of manufacture of the multilayer capacitor chips according to the method of the present invention.
Figure 13B:
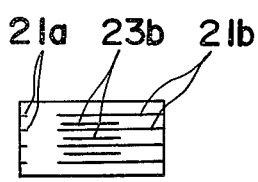
Figure 14:
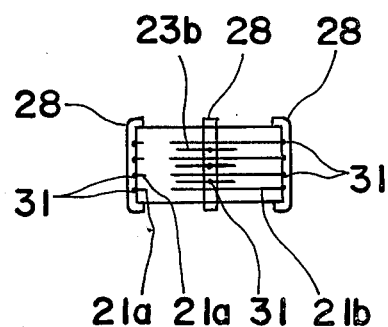

The capacitor block 24 of laminated structure is cut along the broken line A-B into two block halves each containing the chip regions I and III or II and IV, leaving the tip portions of the conductor layers 27 of the electrode portions 21a and 21c in the block half containing the chip regions II and IV, as can readily be understood from FIG. 13. The capacitor block 24 is cut along the broken line I-J to allow the conductor layers 27 of the electrode portions 21b and 21d to be exposed to the outside from the cut edge. The capacitor block 24 is also cut along the broken line C-D to allow the tip portions of the conductor layers 27 of the electrode portions 22a and 22b to remain in the respective chip regions III and IV at respective locations between the conductor layers of the electrode portions 23c and 23d in the associated chip regions III and IV as can readily be understood from FIG. 15 and also to allow the tip portions of the conductor layers 27 of the electrode portions 23c and 23d to remain in the respective chip regions I and II at respective locations between the conductor layers of the electrode portions 22a and 22b in the associated chip regions I and II.

Figure 5:
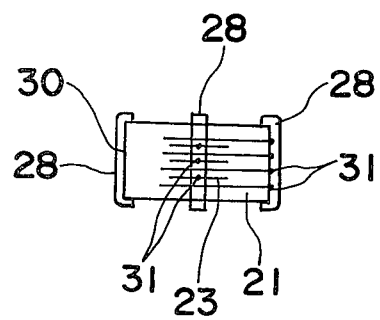
FIG. 5 is a schematic side sectional view of the multilayer capacitor chip shown in FIG. 4(a)
Figure 6A:
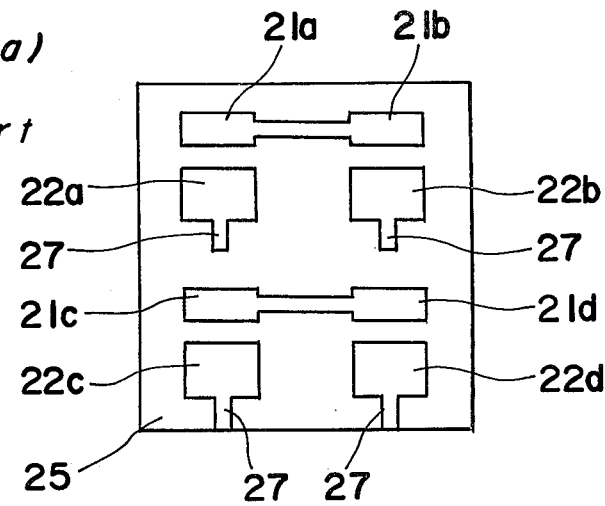
FIGS. 6(a) and 6(b) are plan views showing the sequence of formation of the different type of electrode layers according to the prior art method.
Figure 6B:
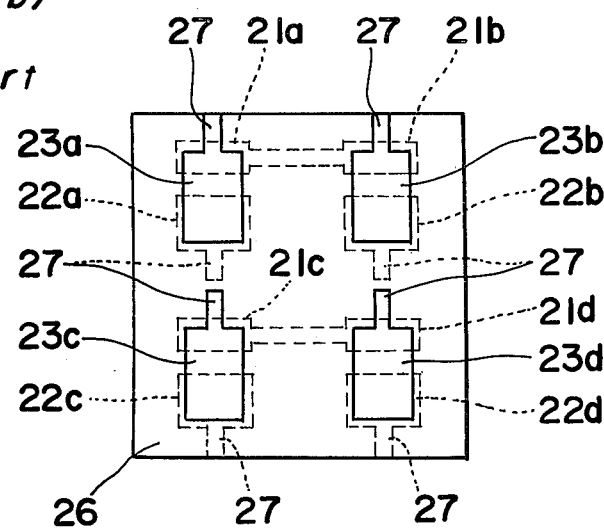
Figure 15:
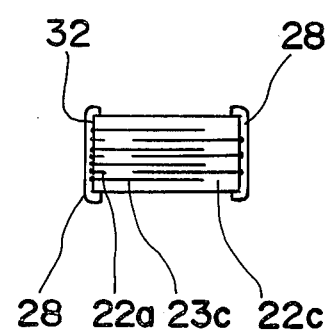

As is the case with the prior art, each of the separate multilayer capacitor chips so manufactured is applied with a known electroconductive paste containing AgPd (a silver-palladium paste). However, in the present invention, since each of the multilayer capacitor chip has the tip portions of the conductor layers 27 of the electrode portions 21a and 21c exposed to the outside from the side face 30 of the chip as shown in FIG. 5, the exposed tip portions of the conductor layers of the electrode portions 21a and 21c are terminated by the electroconductive paste 28 and, accordingly, the bondability of the paste 28 to the side face 30 of the chip can substantially be increased. Likewise, the tip portions of the conductor layers 27 exposed to the outside from the cut edges along the line C-D are terminated by the electroconductive paste 28, as shown in FIG. 15, together with the conductor layers 27 of the electrode portions 22a or 23c and 22b or 23d, and accordingly, the bondability of the electroconductive paste 28 to the side face 32 of the chip can also be substantially increased.

Figure 16:
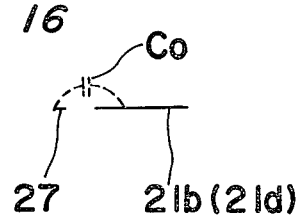
FIG. 16 is a diagram showing an equivalent electric circuit of the multilayer capacitor chip.

In addition, as shown by an equivalent electric circuit in FIG. 16, each of the multilayer capacitor chips obtained from the chip regions II and IV, respectively, has an additional capacitance Co of a smaller value defined between the tip portions of the conductor layers and the respective electrode portions 21b or 21d, which additional capacitance would not be formed according to the prior art method.

Although the present invention has fully been described in connection with the preferred embodiments thereof with reference to the accompanying drawings, it is to be noted that various changes and modifications are apparent to those skilled in the art. By way of example, the number of the multilayer capacitor chips obtained from the single capacitor block may not be limited to four such as described and shown. In addition, although the conductive paste has been described as used to form the terminal electrodes, they can be formed by the use of any known metal vapor deposition technique.

Accordingly, such changes and modifications are to be understood as included within the true scope of the present invention unless they depart therefrom.

We claim:

1. A multilayer capacitor which comprises a plurality of first electrode layers each having a respective first connecting conductor layer; a plurality of second electrode layers each having a respective second connecting conductor layer; dielectric layers each having opposite surfaces on which said first and second electrode layers are formed, respectively, with said first and second conductor layers positioned adjacent the periphery of the respective dielectric layer, said second electrode layers which are positioned between the neighboring two dielectric layers concurrently serving as the first electrode layers for the dielectric layer immediately above such second electrode layer, said first and second electrode layers and said dielectric layers being fabricated together to define a plurality of layered capacitor units which are electrically insulated from each other; and a plurality of independent electroconductive layers formed on each surface of each of said dielectric layers and lying in the same plane as occupied by the electrode layers on each surface of the respective dielectric layer adjacent the periphery of the respective dielectric layer and between the conductor layers of the electrode layers, wherein said multilayer capacitor comprises a plurality of capacitor regions and wherein said independent electroconductive layers are so formed that respective portions of said electroconductive layers and said conductor layers in one of the neighboring capacitor regions can extend into another neighboring capacitor region over a line of division between said neighboring capacitor regions, whereby said layers are positioned at lateral side faces of the multilayer capacitor when said neighboring capacitor regions are separated from each other by cutting along the line of division.

2. A multilayer capacitor as claimed in claim 1, wherein said independent electroconductive layers are formed in electrically insulated relation to said electrode layers and so as to extend over the line of division into adjoining capacitor regions and are exposed to the outside from lateral side faces of the multilayer capacitor when the adjoining capacitor regions are separated by cutting.

3. A multilayer capacitor as claimed in claim 1, wherein said independent electroconductive layers are formed in electrically insulated relation to said electrode layers and so as to extend over a second line of division into a marginal portion to be subsequently disposed of and are exposed to the outside from lateral side faces of the multilayer capacitor when said capacitor is separated from the marginal portion by cutting.

4. A multilayer capacitor which comprises a plurality of first electrode layers each having a respective first connecting conductor layer; a plurality of second electrode layers each having a respective second connecting conductor layer; dielectric layers each having opposite surfaces on which said first and second electrode layers are formed, respectively, with said first and second conductor layers positioned adjacent the periphery of the respective dielectric layer, said second electrode layers which are positioned between neighboring two dielectric layers concurrently serving as the first electrode layers for the dielectric layer immediately above such second electrode layer, said first and second electrode layers and said dielectric layers being fabricated together to define a plurality of layered capacitor units which are electrically insulated from each other; and a plurality of independent electroconductive layers formed on each surface of each of said dielectric layers and lying in the same plane as occupied by the electrode layers on each surface of the respective dielectric layer, wherein said multilayer capacitor comprises a plurality of capacitor regions and respective portions of the conductor layers in one neighboring capacitor region extend into another neighboring capacitor region over a line of division between said neighboring capacitor regions, and are laminated through the electrode and dielectric layers of different layers in the other of the neighboring capacitor regions, said independent electroconductive layers being formed in electrically insulated relation to said electrode layers when the neighboring capacitor regions are separated by cutting along the line of division.

5. A multilayer capacitor as claimed in claim 4, wherein edges of said independent electroconductive layers which are exposed when the neighboring capacitor regions are separated, and edges of said conductor layers which are exposed when the neighboring capacitor regions are separated are connected together at the lateral side faces of the multilayer capacitor by means of respective terminal electrodes.

6. A multilayer capacitor as claimed in claim 4, wherein said terminal electrodes are formed of an electroconductive paste.

7. A multilayer capacitor as claimed in claim 4, wherein said terminal electrodes are formed by metal vapor deposition.

* * * * *